Patented Feb. 7, 1939

2,145,954

UNITED STATES PATENT OFFICE 2,145,954

ANTHRAQUINONE DERIVATIVES

George Crowe Semple and Cecil Shaw, Grangemouth, Stirling, Scotland, assignors to Imperial Chemical Industries Limited, a corporation of Great Britain No Drawing. Application July 16, 1937, Serial No. 154,100. In Great Britain July 22, 1936

5 Claims. (Cl. 260—192)

This invention relates to derivatives of anthraquinone.

This invention has as an object to produce new derivatives of anthraquinone. A further object is to produce new derivatives of anthraquinone which will be useful as dyestuff intermediates. A still further object is to produce new derivatives of anthraquinone which will be useful as dyestuffs. A still further object is to provide new methods of manufacturing derivatives of anthraquinone whereby new derivatives of anthraquinone useful as dyestuffs and as dyestuff intermediates can be obtained.

These objects are accomplished by the following invention. We have found that if we react an anthraquinone compound which has a replaceable negative substituent with a compound of the formula NH$_2$—R—N=N—R' where R stands for an arylene radical and R' stands for an aryl radical, we get a new anthraquinone derivative of the formula Aq—NH—R—N=N—R'. Such derivatives are useful dyestuff intermediates as are their sulphonic acids which are also new and useful as dyestuffs.

The sulphonic acids are manufactured either by (1) sulphonating the azo compounds, or by (2) proceeding in the same way as in making the azo compounds, but using the corresponding starting materials which carry a sulphonic acid group. The sulphonation of the azo compounds may be effected either by treating the azo compounds with sulphonating acids, or in the case of those azo compounds which contain a replaceable halogen atom, treating the compound with a sulphite so as to replace the halogen substituent by a sulphonic acid group.

The azo compounds and their sulphonic acids may contain simple substituents, such as halogen atoms and methyl, amino, acylamino, hydroxyl or alkoxyl groups. The substituents may be in the aryl, arylene or anthraquinonyl nuclei. The substituted azo compounds and their sulphonic acids are made in the same way as the azo compounds themselves and their sulphonic acids, except that instead of the starting materials already mentioned, corresponding ones carrying the above-mentioned simple substituents are used. Valuable intermediates and dyestuffs can be made with these substituents.

The following examples, in which parts are by weight, illustrate, but do not limit the invention.

Example 1

To a solution of 100 parts of sodium-4-bromo-1-aminoanthraquinone-2-sulphonate in 1650 parts of water, 50 parts of p-aminoazobenzene are added, together with 25 parts of sodium carbonate, 100 parts of sodium bicarbonate, 10 parts of cuprous chloride and 275 parts of ethyl alcohol. The mixture is boiled under a reflux condenser for 48 hours during which time the colour of the solution changes from orange-red to yellowish-brown and finally to olive-green, whilst a green precipitate separates out. This precipitate is filtered off. Any unchanged sodium-4-bromo-1-aminoanthraquinone-2-sulphonate is extracted with water, and any p-aminoazobenzene with benzene. The extracted product is dark green, and dissolves in concentrated sulphuric acid with a green colour. It also dissolves in water with a green colour. It dyes wool from an acid bath in green shades of very good fastness to washing, milling and light.

In the above recipe, the sodium-4-bromo-1-aminoanthraquinone-2-sulphonate may be replaced by the corresponding chloro compound: the same dyestuff is obtained. It has the probable formula

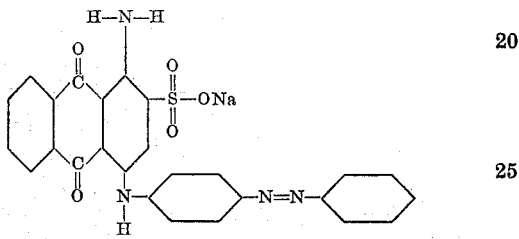

Example 2

To a solution of 100 parts of 4-bromo-1-aminoanthraquinone-2-sulphonic acid in 1650 parts of water, 55.3 parts of p-aminoazobenzene are added together with 25.3 parts of sodium carbonate, 100 parts of sodium bicarbonate, 11.3 parts of copper borate and 550 parts of ethyl alcohol. The mixture is boiled under a reflux condenser for 24 hours. Any unchanged p-aminoazobenzene is extracted from the hot mixture by stirring with 1335 parts of benzene or toluene, filtering the insoluble product and washing with hot benzene or toluene until free from yellow colour. The insoluble product is further purified by extraction with hot dilute hydrochloric acid.

This product is similar to that of Example 1 but is the free acid instead of the sodium salt. Its probable formula is

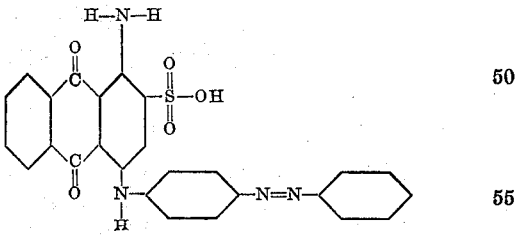

Example 3

To a solution of 100 parts of sodium-4-bromo-1-aminoanthraquinone - 2 - sulphonate in 1570 parts of water, 122.8 parts of p-aminoazobenzene are added, together with 24 parts of sodium carbonate, 95 parts of sodium bicarbonate, 30 parts of copper oxalate and 522 parts of ethyl alcohol. The mixture is boiled under a reflux condenser for 12 hours and the product is isolated as in Example 2. The product is the same as that of Example 3 and is obtained in very good yield. Copper oxalate may be replaced by copper sulphate or nitrate in the above process.

*Example 4*

To a solution of 20 parts of sodium-4-bromo-1-aminoanthraquinone-2-sulphonate in 300 parts of water, 15 parts of sodium-4-aminoazobenzene-4'-sulphonate are added together with 5 parts of sodium carbonate, 20 parts of sodium bicarbonate, 1 part of cuprous chloride and 100 parts of ethyl alcohol. The mixture is boiled as in Example 1 the colour of the solution changing from yellow-orange to yellowish-green and finally to bright green. The product which separates on cooling is filtered off and purified by recrystallizing from water. It dissolves in concentrated sulphuric acid with a brilliant violet colour and in water with a green colour. It dyes wool from an acid bath in green shades similar to those of Example 1. It has the probable formula

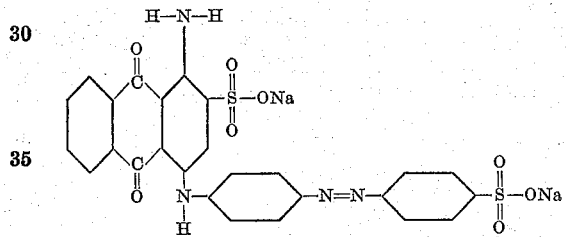

*Example 5*

To a solution of 23 parts of 2:4-dibromo-1-aminoanthraquinone-5-sulphonic acid in 330 parts of water, 10.4 parts of p-aminoazobenzene are added together with 5 parts of sodium carbonate, 20 parts of sodium bicarbonate, 2 parts of cuprous chloride and 100 parts of ethyl alcohol. The mixture is boiled under a reflux condenser for 48 hours and the product is isolated as in Example 1. It dissolves in concentrated sulphuric acid with a dull red-violet colour which changes to green on diluting with water. It dyes wool from an acid bath in fast green shades. It has the probable formula

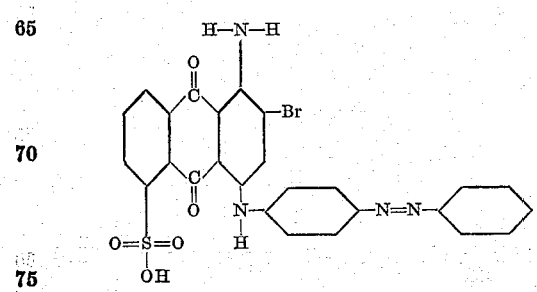

*Example 6*

To a solution of 20.8 parts of 5-chloro-4-bromo-1-aminoanthraquinone-2-sulphonic acid in 247.5 parts of water, 10.5 parts of p-aminoazobenzene are added together with 5 parts of sodium carbonate, 20 parts of sodium bocarbonate, 2.9 parts of copper nitrate and 82.5 parts of ethyl alcohol. The mixture is boiled and the product extracted and isolated as in Example 1. The dyestuff dissolves in concentrated sulphuric acid with a green colour. It dyes wool from an acid bath in yellowish-green shades. The dyeings have slightly superior washing and milling fastness to those of the dyestuff of Example 1. It has the probable formula

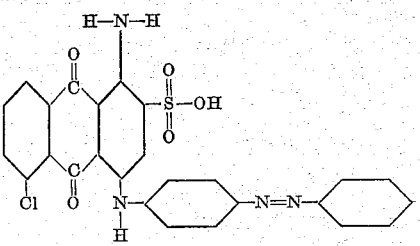

*Example 7*

25 parts of the sulphonic acid prepared in Example 2 are added to 375 parts of 98% sulphuric acid and the mixture is stirred for 20 hours at 10° C. The melt is then diluted with water to 50% sulphuric acid and the precipitate filtered and washed with 50% sulphuric acid. It is then stirred with 2% hydrochloric acid, boiled, filtered and washed with hot 2% hydrochloric acid until the washings are no longer red-violet in colour, and dried. The yield is 26 parts. The dyestuff gives yellowish-green shades on wool. The dyeings have very good fastness to washing and milling. The dyestuff is a disulphonic acid.

*Example 8*

The process of Example 4 is repeated, but using 22 parts of 4-benzeneazo-α-naphthylamine-6(7)-sulphonic acid, (made by coupling diazotized aniline with Cleves acid) instead of the sodium-4-aminoazobenzene-4'-sulphonate. The product dissolves in water, with a green colour. It dyes wool from an acid bath in fast green shades. It will be a mixture of two substances having the probable formulae

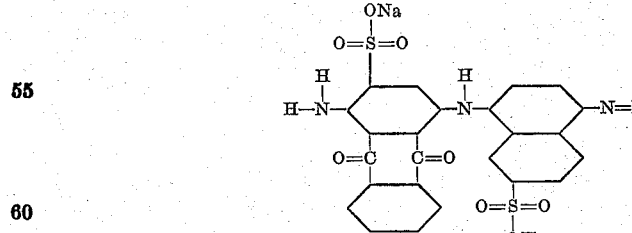 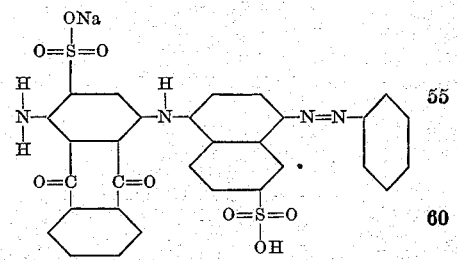

*Example 9*

90 parts of 1-chloroanthraquinone, 75 parts of p-aminoazobenzene, 30 parts of sodium carbonate and 5 parts of cuprous iodide are heated together with stirring in 750 parts of o-dichlorobenzene at 175–180° C. for 15 hours. The mixture is cooled, when a dark red product crystallized out. This is filtered, washed successively with o-dichlorobenzene, ethyl alcohol, hot water and dried. The dry product is dark red in colour, dissolving in concentrated sulphuric acid with an olive-green colour, which turns bright blue-violet, then bright red-violet and finally gives a dark red precipitate upon dilution. The product crystallizes in dark red leaflets, M. P. 215–217° C. from nitrobenzene and o-dichlorobenzene, and has the probable formula

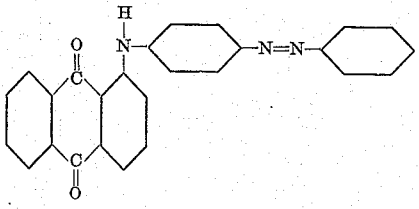

Example 10

155 parts of sodium anthraquinone-1-sulphonate, 197 parts of p-aminoazobenzene and 1000 parts of methyl alcohol are heated together under pressure at 150° C. for 16 hours. The mixture is cooled and the product filtered off, washed with methyl alcohol, with boiling water and dried. The dry product is the same as that of Example 9.

Example 11

36 parts of 4-chloro-1-benzoylaminoanthraquinone, 20 parts of p-aminoazobenzene, 8 parts of sodium carbonate, and 1 part of cuprous iodide are heated together in 200 parts of o-dichlorobenzene at 175–180° C. for 15 hours, during which time the solution changes to a dark green colour. On cooling a dark green compound separates, and this is filtered, washed successively with o-dichlorobenzene, ethyl alcohol and hot water and then dried. The product is a greenish-black solid. It may be purified by extraction with boiling glacial acetic acid in which it is insoluble and after this treatment it melts at 262° C. It has the probable formula

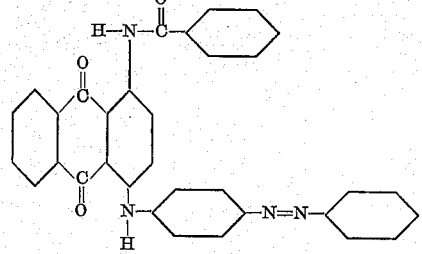

In Example 1 we could have used instead of p-aminoazobenzene, o-aminoazotoluene.

As many apparently widely different embodiments of this invention may be made without departing from the spirit and scope thereof, it is to be understood that we do not limit ourselves to the specific embodiments thereof except as defined in the appended claims.

We claim:

1. The process for the preparation of azo compounds of the formula AQ—NH—R—N=N—R', wherein AQ stands for an anthraquinonyl radical, R stands for an arylene radical, and R' stands for an aryl radical, said arylene and aryl radicals being taken from the class consisting of those of the benzene and naphthalene series, which comprises reacting an anthraquinone compound which carries a replaceable halogen atom with a compound of the formula $NH_2$—R—N=N—R' in which R and R' have the same significance as above.

2. The process as defined in claim 1 wherein at least one of the starting materials contains at least one sulfonic acid group.

3. The process for the preparation of azo compounds of the formula AQ—NH—R—N=N—R', wherein AQ stands for an anthraquinonyl radical, R stands for an arylene radical, and R' stands for an aryl radical, said arylene and aryl radicals being taken from the class consisting of those of the benzene and naphthalene series, which comprises reacting an anthraquinone compound which carries a replaceable halogen atom with a compound of the formula $NH_2$—R—N=N—R' in which R and R' have the same significance as above, and introducing at least one sulfonic acid group into said anthraquinone azo compound.

4. Azo compounds of the anthraquinone series having the following general formula

AQ—NH—R—N=N—R', wherein AQ stands for an anthraquinonyl radical, R stands for an arylene radical, and R' stands for an aryl radical, said arylene and aryl radicals being taken from the class consisting of those of the benzene and naphthalene series; and their sulfonic acids.

5. Sulfonic acid derivatives of the azo compounds of the anthraquinone series having the following general formula AQ—NH—R—N=N—R', wherein AQ stands for an anthraquinonyl radical, R stands for an arylene radical, and R' stands for an aryl radical, said arylene and aryl radicals being taken from the class consisting of those of the benzene and naphthalene series, which carry at least one sulfonic acid group in at least one of said arylene and aryl radicals.

GEORGE CROWE SEMPLE.
CECIL SHAW.